(12) United States Patent
Turányi et al.

(10) Patent No.: US 12,474,967 B2
(45) Date of Patent: Nov. 18, 2025

(54) HANDLING EXECUTION OF A FUNCTION

(71) Applicant: Telefonaktiebolaget LM Ericsson (publ), Stockholm (SE)

(72) Inventors: Zoltán Turányi, Szentendre (HU); Dániel Géhberger, Montreal (CA); Gabor Nemeth, Budapest (HU); Péter Mátray, Budapest (HU); Balázs Pinczel, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 571 days.

(21) Appl. No.: 17/777,653

(22) PCT Filed: Nov. 21, 2019

(86) PCT No.: PCT/EP2019/082078
§ 371 (c)(1),
(2) Date: May 18, 2022

(87) PCT Pub. No.: WO2021/098962
PCT Pub. Date: May 27, 2021

(65) Prior Publication Data
US 2023/0033971 A1     Feb. 2, 2023

(51) Int. Cl.
*G06F 9/50*     (2006.01)
*H04L 67/1008*     (2022.01)

(52) U.S. Cl.
CPC .......... *G06F 9/505* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 9,723,069 B1* | 8/2017 | Fallows | H04L 67/1036 |
| 2008/0177424 A1* | 7/2008 | Wheeler | G06F 9/5077 |
| | | | 700/295 |
| 2009/0031307 A1* | 1/2009 | Chodroff | G06F 11/3055 |
| | | | 718/100 |
| 2009/0265568 A1* | 10/2009 | Jackson | G06F 1/3203 |
| | | | 713/320 |

(Continued)

FOREIGN PATENT DOCUMENTS

WO     2017207049 A1     12/2017

OTHER PUBLICATIONS

EPO Communication dated Oct. 24, 2024 for Patent Application No. 19808576.3, consisting of 15 pages.
Aumala, G.; Beyond Load Balancing: Package-Aware Scheduling for Serverless Platforms; 2019 19th IEEE/ACM International Symposium on Cluster, Cloud and Grid Computing (CCGRID); 2019, consisting of 10 pages.

(Continued)

*Primary Examiner* — Adam Lee
(74) *Attorney, Agent, or Firm* — Weisberg I.P. Law, P.A.

(57) ABSTRACT

There is provided a method for handling execution of a function in a function-as-a-service (FaaS) system. According to the method, in response (200) to a trigger on a first node of the FaaS system for execution of a function, execution of the function is initiated (206) on the first node of the FaaS system if data to be accessed for the execution is stored on the first node of the FaaS system and/or execution of the function is initiated (210) on a second node of the FaaS system if the data to be accessed for the execution is stored on the second node of the FaaS system.

20 Claims, 7 Drawing Sheets

(56) References Cited

U.S. PATENT DOCUMENTS

| | | | | |
|---|---|---|---|---|
| 2013/0111467 | A1* | 5/2013 | Sundararaj | G06F 9/505 |
| | | | | 709/224 |
| 2014/0075222 | A1* | 3/2014 | Jackson | G06F 1/329 |
| | | | | 713/320 |
| 2016/0344821 | A1* | 11/2016 | Khosrowpour | H04L 67/1029 |
| 2019/0042308 | A1* | 2/2019 | Kumar | G06F 9/4881 |
| 2019/0313059 | A1* | 10/2019 | Agarawala | G06F 3/011 |
| 2019/0324820 | A1* | 10/2019 | Krishnan | G06F 9/5077 |
| 2020/0120112 | A1* | 4/2020 | Cybulski | H04L 63/102 |
| 2020/0125657 | A1* | 4/2020 | Thode | G06F 16/2358 |
| 2020/0133702 | A1* | 4/2020 | Sharma | G06F 9/5088 |
| 2020/0183758 | A1* | 6/2020 | Subramaniam | G06F 9/4856 |
| 2020/0310828 | A1* | 10/2020 | Turull | G06F 9/547 |
| 2020/0387625 | A1* | 12/2020 | Saad | G06F 21/6227 |
| 2020/0389410 | A1* | 12/2020 | Guim Bernat | H04L 67/10 |
| 2021/0149742 | A1* | 5/2021 | Turanyi | G06F 9/5033 |
| 2021/0176326 | A1* | 6/2021 | Carley | H04L 67/55 |
| 2021/0263779 | A1* | 8/2021 | Haghighat | G06F 9/5061 |

OTHER PUBLICATIONS

Nemeth, Gabor, et al., "DAL: A Locality-Optimizing Distributed Shared Memory System", Ericsson research, <https://www.usenix.org/conference/hotcloud17/program/presentation/nemeth>, 2017, 1-6.

Totoy, Gustav, et al., "An Extensible Scheduler for the Open Lambda FaaS Platform", Proceedings of Workshop on Hardware/Software Techniques for Minimizing Data Movement (MinMove'18), Williamsburg, VA, 2018, 1-4.

Xie, Qiaomin, et al., "Pandas: Robust Locality-Aware Scheduling With Stochastic Delay Optimality", IEEE/ACM Transactions on Networking, vol. 25, No. 2, Apr. 2017, 1-14.

* cited by examiner

HANDLING EXECUTION OF A FUNCTION

TECHNICAL FIELD

The disclosure relates to a method for handling execution of a function in a function-as-a-service (FaaS) system and a node configured to operate in accordance with the method.

BACKGROUND

Traditional execution models in cloud computing include infrastructure-as-a-service (IaaS) systems, where a user of the cloud needs to provide virtual machines for the execution of a function. More recent execution models in cloud computing include function-as-a-service (FaaS) systems.

In FaaS systems, a user of the cloud only needs to upload functions as the execution environment is provided by the operator of the platform, together with proper packaging, triggering, monitoring, dimensioning and scaling rules. The main advantage of FaaS systems is that developers can focus purely on the application logic and leave the mechanics of operation to the system. In FaaS systems, functions are attached to pre-defined triggering events and are executed when those events occur. Such events can be, for example, when a hypertext transfer protocol (HTTP) query arrives at a node of a FaaS system; a given key is changed in a database storing key values; or a given time elapses. Functions are required to be stateless by relying only on input data (e.g. HTTP body) and data that is externalized into databases.

There exist various open source and commercial FaaS systems. In open source FaaS systems, it is the responsibility of a data center operator to provide databases for state externalisation. As is understood in the art, state externalisation is where a state of a function (or, more generally, data to be accessed for execution of the function, like e.g. variables and/or values used by the function) is not stored in a database assigned to the function, i.e. is not stored locally. Instead, the state of the function is stored in another database, which can be referred to as an external database. This external database is responsible for reliably and scalably storing the state of the function. In this way, when a client application fails, the state of the function is not lost, but is safely available for another (or restarted) instance of the client application. This allows "stateless" nodes, which do not store a state of the function between executions. However, it means that these nodes need to fetch the relevant state of the function from the external database each time they execute the function and then write the state of the function to the external database once the execution of the function is complete. In commercial FaaS systems, users can select from a wide range of databases for state externalisation. The most commonly used databases are key-value stores.

In order to scale, a FaaS system usually comprises a plurality of nodes, such as a plurality of physical and/or virtual machines. The plurality of nodes of the FaaS system can be referred to as a FaaS cluster. The FaaS cluster forms a distributed system for executing functions. The FaaS cluster and the databases of the FaaS system are typically deployed to different physical nodes. In some more general systems, the performance of a single node can be improved by redistributing resources locally at the node, e.g. closely coupled resources may be moved closer to each other, while resources that communicate less frequently may be left farther apart. However, in a FaaS system, multiple different functions may access (e.g. the same set of) externalized states. As such, existing FaaS systems often require functions to remotely access data for their execution, which can result in suboptimal performance and suboptimal resource usage.

There is thus a need for an improved technique, which is aimed at addressing at least some of the problems associated with existing algorithms.

SUMMARY

It is an object to obviate or eliminate at least some of the above-described disadvantages associated with existing techniques and provide an improved technique for handling execution of a function in a function-as-a-service (FaaS) system. In particular, existing FaaS systems do not currently support the co-location of data and function execution, which would be beneficial from a performance point of view by reducing data access times.

Therefore, according to an aspect of the disclosure, there is provided a method for handling execution of a function in a FaaS system. The method comprises, in response to a trigger on a first node of the FaaS system for execution of a function, initiating execution of the function on the first node of the FaaS system if data to be accessed for the execution is stored on the first node of the FaaS system and/or initiating execution of the function on a second node of the FaaS system if the data to be accessed for the execution is stored on the second node of the FaaS system.

There is thus provided an improved method for handling execution of a function in a FaaS system. In particular, local access of data is ensured and remote access of data is avoided. An optimal partitioning of data in the FaaS system can be achieved in this way. This means that data access times are decreased (e.g. local access is expected to be about twenty times faster than remote access) and functions can be executed faster. As a result, the throughput of the FaaS system may be increased, since more functions can be executed in any given time. Also, the local access that is ensured can reduce the load on the FaaS system. The overall performance of the FaaS system is thus optimised in this way.

In some embodiments, the execution of the function may be initiated on the same node as at least one other function for which the same data is to be accessed for execution of the at least one other function. In this way, the function and the at least one other function can access data locally, which further reduces data access times and thus the advantages described earlier are provided to an even greater extent.

In some embodiments, the data stored on the first node of the FaaS system may be specific to a first subscriber and/or a location of the first subscriber. In some embodiments, the data stored on the second node of the FaaS system may be specific to a second subscriber and/or a location of the second subscriber. In this way, load balancing of the computation (which may also be referred to as sharding) can be performed on a per subscriber granularity as compared to larger groups of subscribers.

In some embodiments, an input provided to the function may be indicative of the data to be accessed for the execution or a majority of the data to be accessed for the execution. In this way, an improved decision can be made on which node is to execute a function based on this input in order to provide the advantages associated with local data access (versus remote data access) described above.

In some embodiments, an input provided to the function may be indicative of a subscriber to which the data is specific and/or a location of the subscriber to which the data is specific. In this way, data associated with a subscriber (such as its state or context) does not have to be explicitly listed in the input but can be collectively referred to by specifying the identity of the subscriber and/or its location, whilst still allowing the function to be executed at a node that ensures local data access to provide the corresponding advantages associated with this described above.

In some embodiments, if a load generated by the execution of the function is greater than an available capacity of the node on which the execution is initiated, the execution of the function may be initiated on a third node of the FaaS system for which an available capacity is less than the load generated by the execution and at which the data to be accessed for the execution is stored. In this way, overloading of nodes can be avoided if free capacity is available at another node. Also, queues of incoming function execution requests in a node of the FaaS system can be avoided when that node is overloaded, which prevents delays and reduces function start-up times. Moreover, starting a new node in the FaaS system (i.e. scaling-out the FaaS system) can be avoided until there is no free capacity in already running nodes.

In some embodiments, the method may comprise assigning the function to an existing group of functions for which the same data is to be accessed for execution of the functions or creating a group of functions comprising the function and at least one other function for which the same data is to be accessed for execution of the functions. In this way, these functions (accessing the same data) can be collectively allocated to the same node for execution to ensure local data access for each of them.

In some embodiments, the group of functions may be executable on the same node. In this way, a group of functions that are known (e.g. to a function maintainer) to work on the same data can benefit from the local access advantages described above.

In some embodiments, if a load generated by execution of the group of functions becomes greater than the available capacity of a node of the FaaS system on which the group of functions is executed, execution of functions of the group specific to a subscriber may be switched from the node of the FaaS system on which the group of functions is executed to another node of the FaaS system at which data to be accessed for execution of the functions of the group specific to the subscriber is stored. In this way, the FaaS system can be scaled-out whilst continuing to ensure local data access. Also, execution of functions for the same subscriber may be kept together even in the case of scaling-out, thereby allowing local access to data of the subscriber for all functions in the group invoked for this subscriber. It will be understood that, although scaling-out has been described from one node to another node, scaling-out may be from N nodes to M nodes, where M is greater than N.

In some embodiments, the group of functions may be executed on a plurality of nodes of the FaaS system. In some of these embodiments, if a load generated by execution of the group of functions becomes a predefined amount less than a combined available capacity of the plurality of nodes of the FaaS system on which the group of functions is executed, for a selected node of the plurality of nodes of the FaaS system, execution of functions of the group may be switched from the selected node of the FaaS system to another node of the FaaS system that is executing functions of the group. In this way, the FaaS system can be scaled-in. In particular, load can be consolidated onto a smaller number of nodes of the FaaS system in case of low-load situations. This frees up nodes of the FaaS system and thus also frees up resources. It will be understood that, although scaling-in has been described from one node to another node, scaling-in may be from M nodes to N nodes, where N is less than M.

According to another aspect of the disclosure, there is provided a node configured to operate in accordance with the method described earlier. In some embodiments, the node may comprise processing circuitry configured to operate in accordance with the method described earlier. In some embodiments, the node may comprise at least one memory for storing instructions which, when executed by the processing circuitry, cause the node to operate in accordance with the method described earlier. The node thus provides the advantages discussed earlier in respect of the method performed by the node. In some embodiments, the node may be the first node.

According to another aspect of the disclosure, there is provided a FaaS, system comprising at least one node as described earlier. The FaaS system thus provides the advantages discussed earlier in respect of the method performed by the node.

According to another aspect of the disclosure, there is provided a computer program comprising instructions which, when executed by processing circuitry, cause the processing circuitry to perform the method described earlier. The computer program thus provides the advantages discussed earlier in respect of the method.

According to another aspect of the disclosure, there is provided a computer program product, embodied on a non-transitory machine-readable medium, comprising instructions which are executable by processing circuitry to cause the processing circuitry to perform the method described earlier. The computer program product thus provides the advantages discussed earlier in respect of the method.

Therefore, an advantageous technique for handling execution of a function in a FaaS system is provided.

BRIEF DESCRIPTION OF THE DRAWINGS

For a better understanding of the technique, and to show how it may be put into effect, reference will now be made, by way of example, to the accompanying drawings, in which.

DETAILED DESCRIPTION

As mentioned earlier, an advantageous technique for handling execution of a function in a function-as-a-service (FaaS) system is provided.

Generally, a FaaS system provides a platform that allows application functionality to be developed, run and managed without the complexity of building and maintaining an infrastructure in order to do so. In a FaaS system, multiple functions may work on the same (externalized) data. For example, in the case of a FaaS system that handles mobile control plane events, one function may be responsible for handling a handover of a user equipment (UE) between two cells, while another function may be responsible for moving the UE to idle mode. Both functions are related to a UE and, as they are executed, they modify and store an overlapping set of data in a database used for storing information indicative of a state of the UE.

The functions in a FaaS system are attached to a trigger for execution of a function. This trigger referred to herein can be referred to as a "triggering event". Examples of such a trigger referred to herein include but are not limited to a hypertext transfer protocol (HTTP) request (such as a GET request or a POST request) to a uniform resource locator (URL) via the HTTP, an incoming message through a messaging system, or a change in a database. Herein, a method is described for handling execution of a function in a FaaS system in response to a trigger on a node of the FaaS system for execution of the function.

Figure 1:
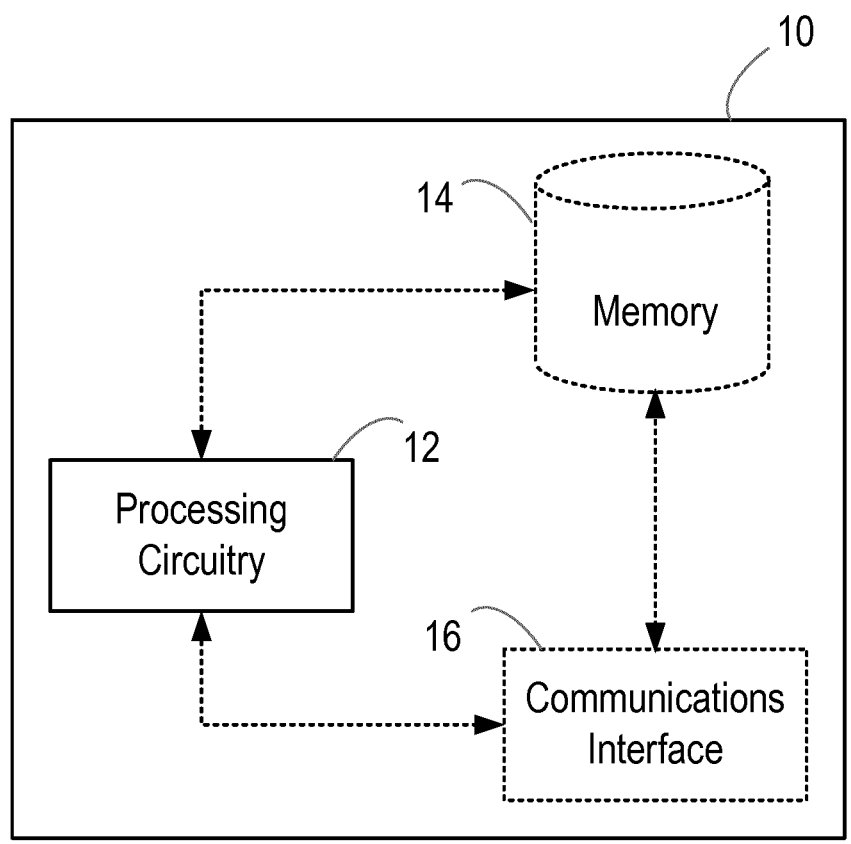
FIG. 1 is a block diagram illustrating a node according to an embodiment.

FIG. 1 illustrates a node 10 in accordance with an embodiment. The node 10 is for handling execution of a function in a FaaS system. The node 10 may be a node of a network, e.g. a fifth generation (5G) network or any other generation network.

As illustrated in FIG. 1, the node 10 comprises processing circuitry (or logic) 12. The processing circuitry 12 controls the operation of the node 10 and can implement the method described herein. The processing circuitry 12 can comprise one or more processors, processing units, multi-core processors or modules that are configured or programmed to control the node 10 in the manner described herein. In particular implementations, the processing circuitry 12 of the node 10 can comprise a plurality of software and/or hardware modules that are each configured to perform, or are for performing, individual or multiple steps of the method described herein.

Briefly, the processing circuitry 12 of the node 10 is configured to, in response to a trigger on a first node of the FaaS system for execution of a function, initiate execution of the function on the first node of the FaaS system if data to be accessed for the execution is stored on the first node of the FaaS system and/or initiate execution of the function on a second node of the FaaS system if the data to be accessed for the execution is stored on the second node of the FaaS system. Herein, the term "initiate" can mean, for example, cause or establish. Thus, for example, the processing circuitry 12 of the node 10 may itself establish execution of the function or may cause another node to establish execution of the function. Herein, the data to be accessed for execution of a function may, for example, comprise a state of the function and/or a context in which function is to be executed.

In some embodiments, the node 10 may be the first node of the FaaS system. In these embodiments, the first node of the FaaS system may be capable of communicating with the second node of the FaaS system and/or any other nodes of the FaaS system. In other embodiments, the node 10 may be the second node of the FaaS system. In these embodiments, the second node of the FaaS system may be capable of communicating with the first node of the FaaS system and/or any other nodes of the FaaS system. In yet other embodiments, the node 10 may be any other node of the FaaS system. For example, the node 10 may be a separate node to those nodes of the FaaS (e.g. the first node of the FaaS and/or second node of the FaaS) at which the data to be accessed for the execution is stored. In these embodiments, the node 10 may be capable of communicating with the first node of the FaaS system, the second node of the FaaS system, and/or any other nodes of the FaaS system. The nodes referred to herein may also be referred to as "compute nodes".

Returning back to FIG. 1, as illustrated, the node 10 may optionally comprise a memory 14. The memory 14 of the node 10 can comprise a volatile memory or a non-volatile memory. In some embodiments, the memory 14 of the node 10 may comprise a non-transitory media. Examples of the memory 14 of the node 10 include, but are not limited to, a random-access memory (RAM), a read only memory (ROM), a mass storage media such as a hard disk, a removable storage media such as a compact disk (CD) or a digital video disk (DVD), and/or any other memory.

The processing circuitry 12 of the node 10 can be connected to the memory 14 of the node 10. In some embodiments, the memory 14 of the node 10 may be for storing program code or instructions which, when executed by the processing circuitry 12 of the node 10, cause the node 10 to operate in the manner described herein in respect of the node 10. For example, in some embodiments, the memory 14 of the node 10 may be configured to store program code or instructions that can be executed by the processing circuitry 12 of the node 10 to cause the node 10 to operate in accordance with the method described herein in respect of the node 10. Alternatively, or in addition, the memory 14 of the node 10 can be configured to store any requests, responses, indications, information, data, notifications, signals, or similar, that are described herein. The processing circuitry 12 of the node 10 may be configured to control the memory 14 of the node 10 to store any requests, responses, indications, information, data, notifications, signals, or similar, that are described herein.

In some embodiments, as illustrated in FIG. 1, the node 10 may optionally comprise a communications interface 16. The communications interface 16 of the node 10 can be connected to the processing circuitry 12 of the node 10 and/or the memory 14 of node 10. The communications interface 16 of the node 10 may be operable to allow the processing circuitry 12 of the node 10 to communicate with the memory 14 of the node 10 and/or vice versa. Similarly, the communications interface 16 of the node 10 may be operable to allow the processing circuitry 12 of the node 10 to communicate with the first node of the FaaS system, the second node of the FaaS system, and/or any other nodes of the FaaS system. The communications interface 16 of the node 10 can be configured to transmit and/or receive any requests, responses, indications, information, data, notifications, signals, or similar, that are described herein. In some embodiments, the processing circuitry 12 of the node 10 may be configured to control the communications interface 16 of the node 10 to transmit and/or receive any requests, responses, indications, information, data, notifications, signals, or similar, that are described herein.

Although the node 10 is illustrated in FIG. 1 as comprising a single memory 14, it will be appreciated that the node 10 may comprise at least one memory (i.e. a single memory or a plurality of memories) 14 that operate in the manner described herein. Similarly, although the node 10 is illustrated in FIG. 1 as comprising a single communications interface 16, it will be appreciated that the node 10 may comprise at least one communications interface (i.e. a single communications interface or a plurality of communications interface) 16 that operate in the manner described herein.

It will also be appreciated that FIG. 1 only shows the components required to illustrate an embodiment of the node 10 and, in practical implementations, the node 10 may comprise additional or alternative components to those shown.

The first node and/or the second node referred to herein may comprise the same components of the node 10, as described with reference to FIG. 1.

Figure 2:
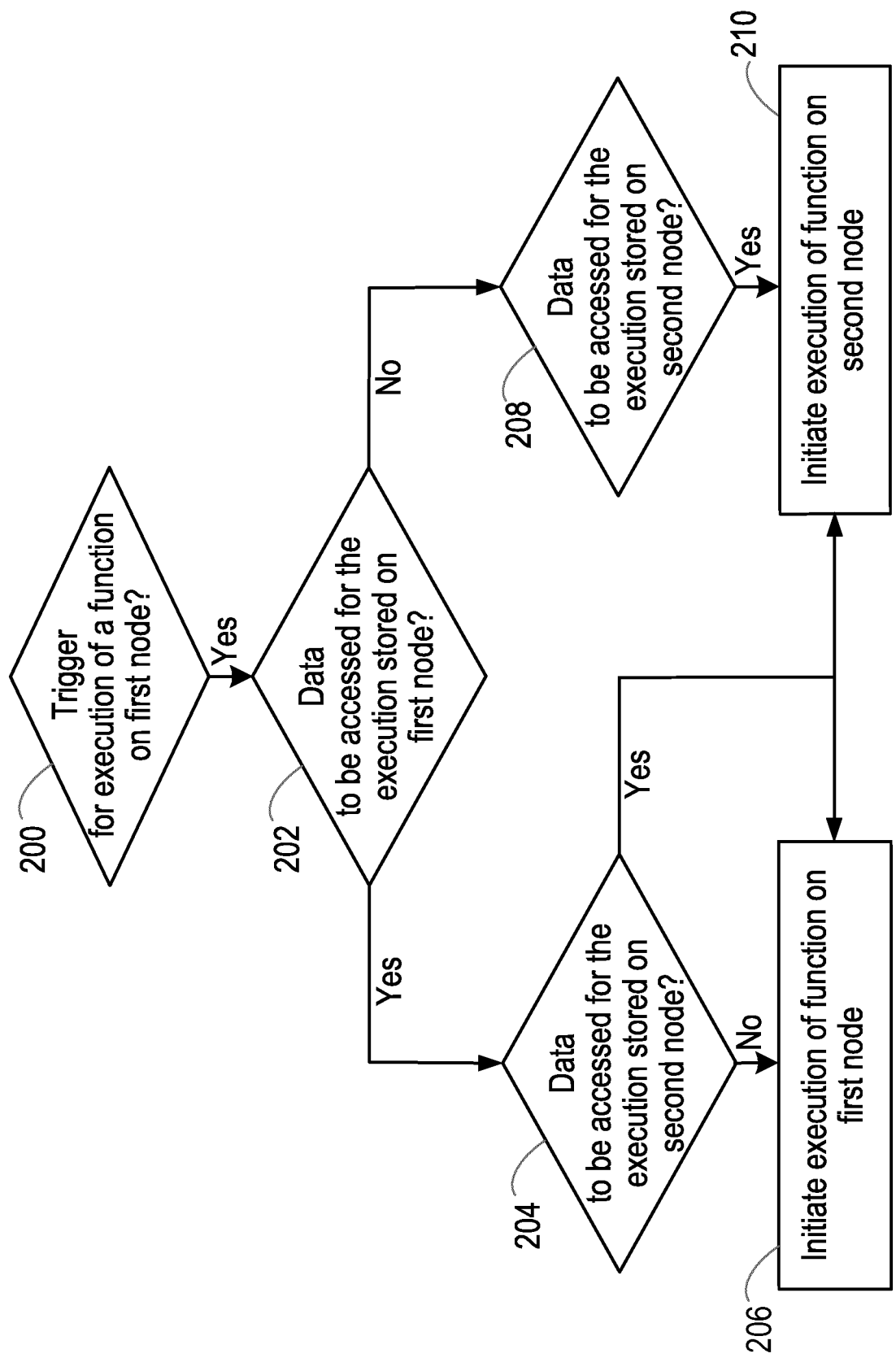
FIG. 2 is a block diagram illustrating a method performed by a node according to an embodiment.

FIG. 2 is a flowchart illustrating a method performed by a node 10 in accordance with an embodiment. The method is for handling execution of a FaaS system. The node 10 described earlier with reference to FIG. 1 is configured to operate in accordance with the method of FIG. 2. The method can be performed by or under the control of the processing circuitry 12 of the node 10.

As illustrated at block 200 of FIG. 2, the method is performed in response to a trigger on a first node of the FaaS system for execution of a function. At block 202 of FIG. 2, if data to be accessed for the execution is stored on the first node of the FaaS system, the method may proceed to block 204 of FIG. 2. At block 204 of FIG. 2, if data to be accessed for the execution is not stored on the second node of the FaaS system, the method proceeds to block 206 of FIG. 2. Alternatively, if, at block 202, data to be accessed for the execution is stored on the first node of the FaaS system, the method may proceed directly to block 206 of FIG. 2. At block 206, execution of the function is initiated on the first node of the FaaS system. More specifically, the processing circuitry 12 of the node 10 initiates execution of the function on the first node of the FaaS system. Thus, in this way, execution of the function is allocated to the first node of the FaaS system.

If, at block 202 of FIG. 2, data to be accessed for the execution is not stored on the first node of the FaaS system, the method proceeds to block 208 of FIG. 2. Alternatively, the method may proceed directly from block 200 to block 208. If, at block 208 of FIG. 2, data to be accessed for the execution is stored on the second node of the FaaS system, the method proceeds to block 210 of FIG. 2. At block 210 of FIG. 2, execution of the function is initiated on the second node of the FaaS system. More specifically, the processing circuitry 12 of the node 10 initiates execution of the function on the second node of the FaaS system. Thus, in this way, execution of the function is allocated to the second node of the FaaS system.

If, at block 202 of FIG. 2, data to be accessed for the execution is stored on the first node of the FaaS system and, at block 204, data to be accessed for the execution is also stored on the second node of the FaaS system, the method may proceed to both blocks 206 and 210. Thus, execution of the function may be initiated on the first node of the FaaS system at block 206 of FIG. 2 and the second node of the FaaS system at block 210 of FIG. 2. More specifically, the processing circuitry 12 of the node 10 initiates execution of the function on the first node of the FaaS system and the second node of the FaaS system. Thus, in this way, execution of the function is allocated to the first node of the FaaS system and the second node of the FaaS system.

Thus, according to the method of FIG. 2, the node of the FaaS system at which the function is executed depends on the node of the FaaS system at which data to be accessed for the execution is stored. More specifically, according to the method of FIG. 2, execution of the function is initiated on (or allocated to) one or more nodes of the FaaS system at which data to be accessed for the execution is stored.

In some embodiments, the execution of the function may be initiated on the same node as at least one other function for which the same data is to be accessed for execution of the at least one other function. In some embodiments, the data stored on the first node of the FaaS system may be specific to a first subscriber (or user) and/or a location of the first subscriber. In some embodiments, the data stored on the second node of the FaaS system may be specific to a second subscriber (or user) and/or a location of the second subscriber. In some embodiments, an input provided to the function may be indicative of (or may comprise a token indicative of) the data to be accessed for the execution or a majority of the data to be accessed for the execution. In some embodiments, an input provided to the function may be indicative of (or may comprise a token indicative of) a subscriber (or user) to which the data is specific or a location of the subscriber to which the data is specific. Herein, a subscriber (or user) can be any subscriber (or user) of the FaaS system. That is, a subscriber (or user) can be any entity that is subscribed to (or that is using) the FaaS system. Examples of a subscriber (or user) include, but are not limited to, entities such as a UE (e.g. a mobile terminal), a car, or any other entity.

Although not illustrated in FIG. 2, in some embodiments, if a load generated by the execution of the function is greater than an available capacity of the node on which the execution is initiated, the execution of the function may be initiated on a third node of the FaaS system for which an available capacity is less than the load generated by the execution and at which the data to be accessed for the execution is stored. More specifically, the processing circuitry 12 of the node 10 initiates execution of the function on the third node of the FaaS system.

Although also not illustrated in FIG. 2, in some embodiments, the function may be assigned to an existing group of functions for which the same data is to be accessed for execution of the functions. Alternatively, a group of functions comprising the function and at least one other function for which the same data is to be accessed for execution of the functions may be created. More specifically, the processing circuitry 12 of the node 10 may assign the function to such an existing group of functions or may create such a group of functions. In some of these embodiments, the group of functions may be executable on the same node. Herein, a group of functions may be referred to as "an affinity group". As will be described in more detail later, an affinity group can be used to optimise the execution of a function in the FaaS system.

In some embodiments, an affinity group may contain function attachments (and thus function executions) that work on the same externalized states. In some embodiments, an affinity group may be spread over multiple nodes in the FaaS system. As will be described in more detail later, in some of these embodiments, with the use of the input (e.g. which may comprise a token) passed to the FaaS system during triggering, it is possible to consistently allocate function executions to ensure that the externalized data is locally available, thereby improving execution performance.

As the same executable function may be attached to different triggers, e.g. serving different purposes, the relevant entity is a function attachment from the affinity group point of view. Besides the function attachment, functions may be executed directly through a command line interface or by another function, and in this case the affinity group may also be relevant. For example, if function A directly executes function B, it may be desired for function B to inherit the affinity group setting of function A.

Although not illustrated in FIG. 2, in some embodiments, if a load generated by execution of a group of functions becomes greater than an available capacity of a node of the FaaS system on which the group of functions is executed, execution of the functions of the group specific to a subscriber may be switched from the node of the FaaS system on which the group of functions is executed to another node of the FaaS system (e.g. for which an available capacity is less than the load generated by the execution of the group of functions specific to the subscriber and) at which data to be accessed for execution of the functions of the group specific to the subscriber is stored. More specifically, the processing circuitry 12 of the node 10 may initiate this switching. For example, when a group of functions is first created, it only has a single function assigned to a single node (or a single runtime of a node) but, as the load generated by the new group of functions increases, the node (or the runtime of the node) can hit its load limit.

Thus, in the manner described, execution of functions of the group specific to a subscriber can be re-allocated to a different node (or a runtime of a different node), e.g. that has enough resources available to execute those functions of the group for that subscriber. In this way, the execution of all functions for a specific subscriber can be moved to a different node of the FaaS system. The group of functions (and thus the load) can thus be split into two or more shards and these shards can then be allocated to nodes (or runtimes of nodes) that can handle the (approximated) load. Once a group of functions is sharded, the shards may be re-allocated to less loaded nodes (or less loaded runtimes of nodes). In this way, the FaaS system can be scaled-out.

Thus, in some embodiments, a group of functions may be executed on a plurality of nodes of the FaaS system. In some of these embodiments, if a load generated by execution of the group of functions becomes a predefined amount (e.g. a significantly) less than a combined available capacity of the plurality of nodes of the FaaS system on which the group of functions is executed, for a selected node of the plurality of nodes of the FaaS system, execution of the functions of the group may be switched from the selected node of the FaaS system to another node of the FaaS system that is executing functions of the group. More specifically, the processing circuitry 12 of the node 10 may initiate this switching. As such, in some embodiments that involve splitting a group of functions (and thus a load) into two or more shards as described earlier, if a load of the FaaS system decreases and the group of functions can be serviced by less nodes (or less runtime instances of nodes), the two or more shards of the group of functions may be merged. In some embodiments, the (merged) shards may be re-allocated to leave nodes (or runtime instances of nodes) without function attachments. In this way, the FaaS system can be scaled-in.

Over time, the triggering rate of specific functions may vary, which can cause the load of the FaaS system to also change. For example, if functions are handling events related to a mobile core network, the load may be higher during the day and lower over the night. Thus, the dynamic splitting of groups of functions, the dynamic merging of functions and/or the dynamic re-allocation of functions described earlier can help to balance the load in the FaaS system.

Figure 3:
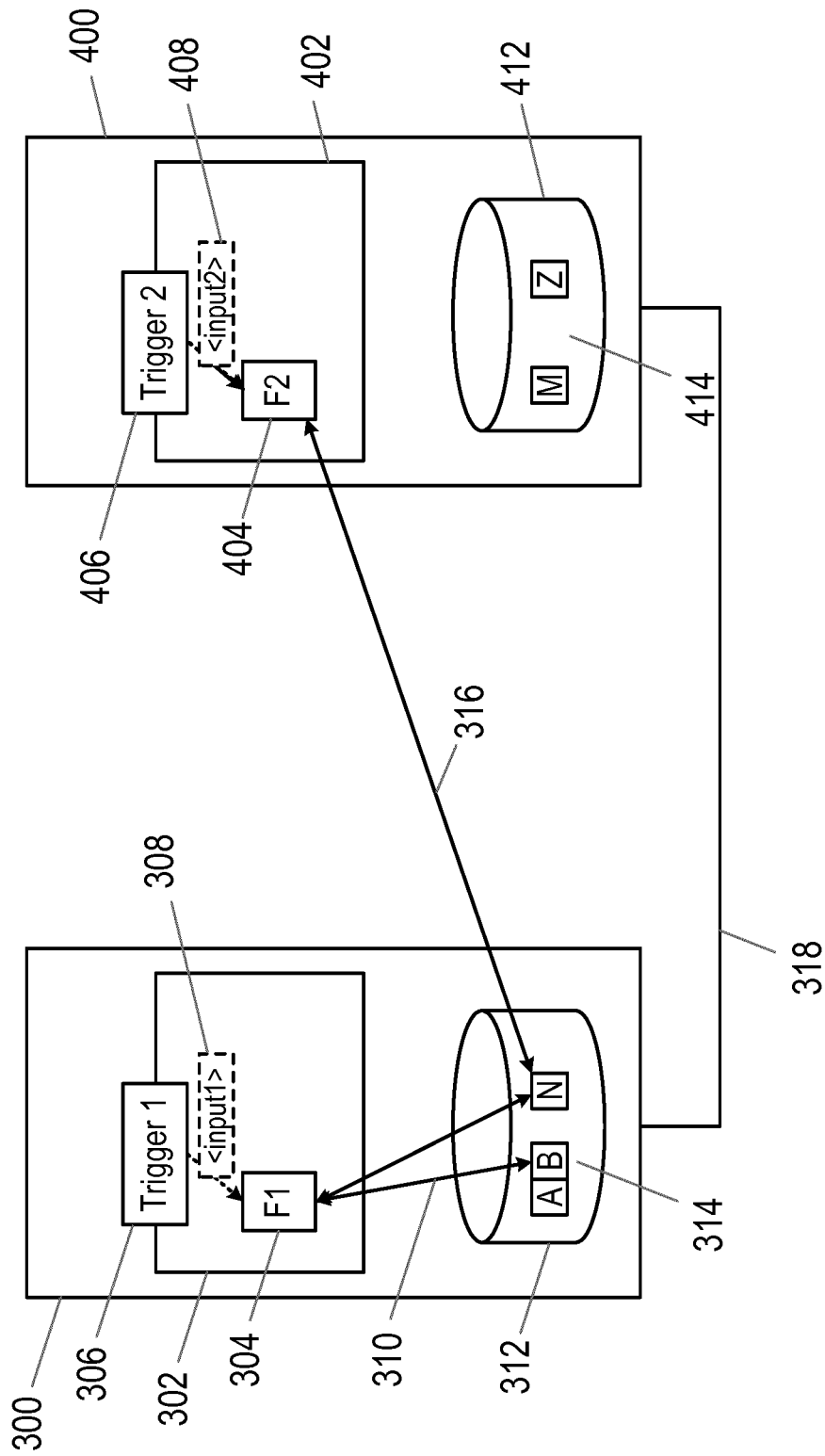
FIG. 3 is a block diagram illustrating an example function-as-a-service system.
Figure 4:
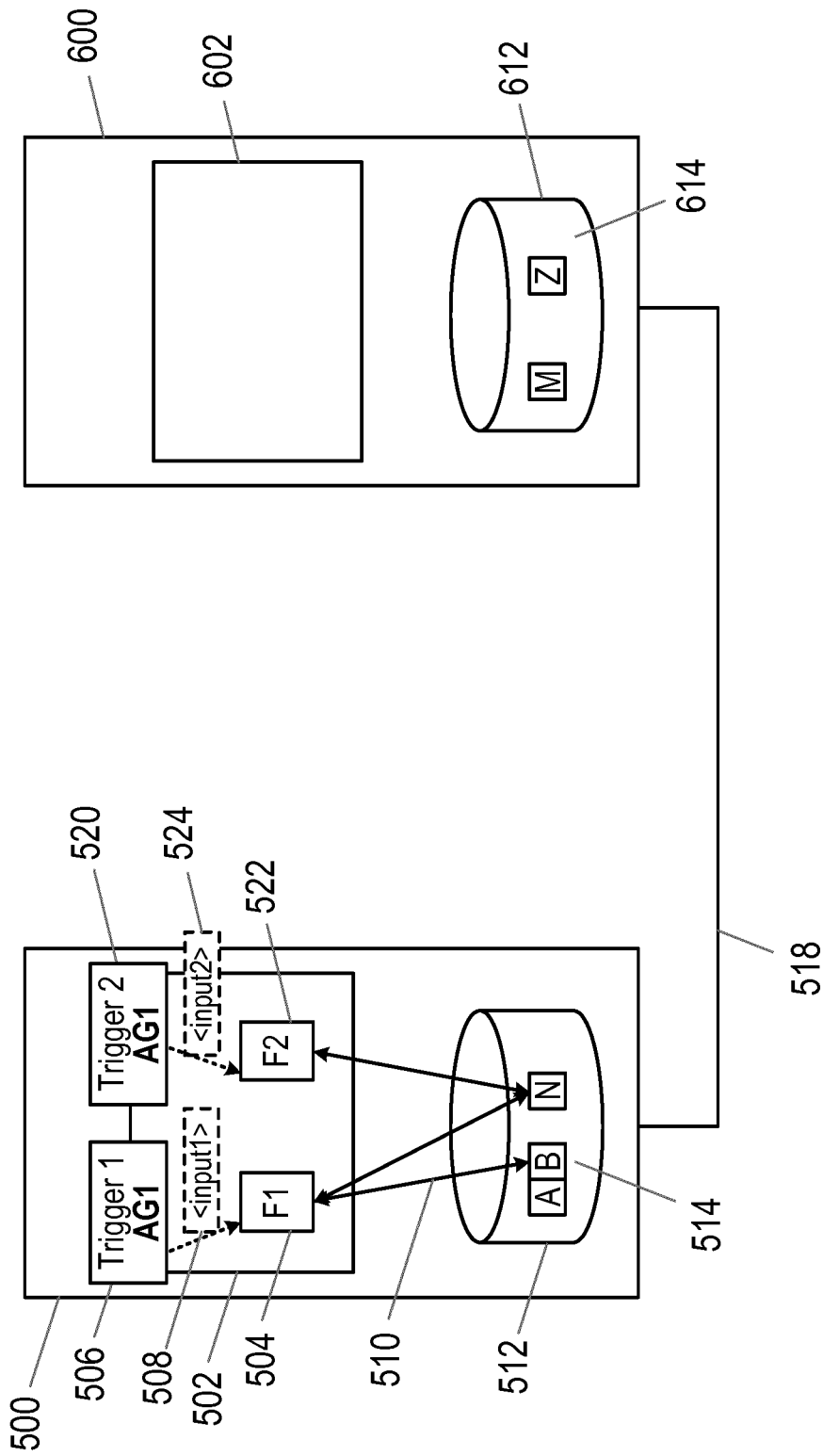
FIG. 4 is a block diagram illustrating an example function-as-a-service system.
Figure 5:
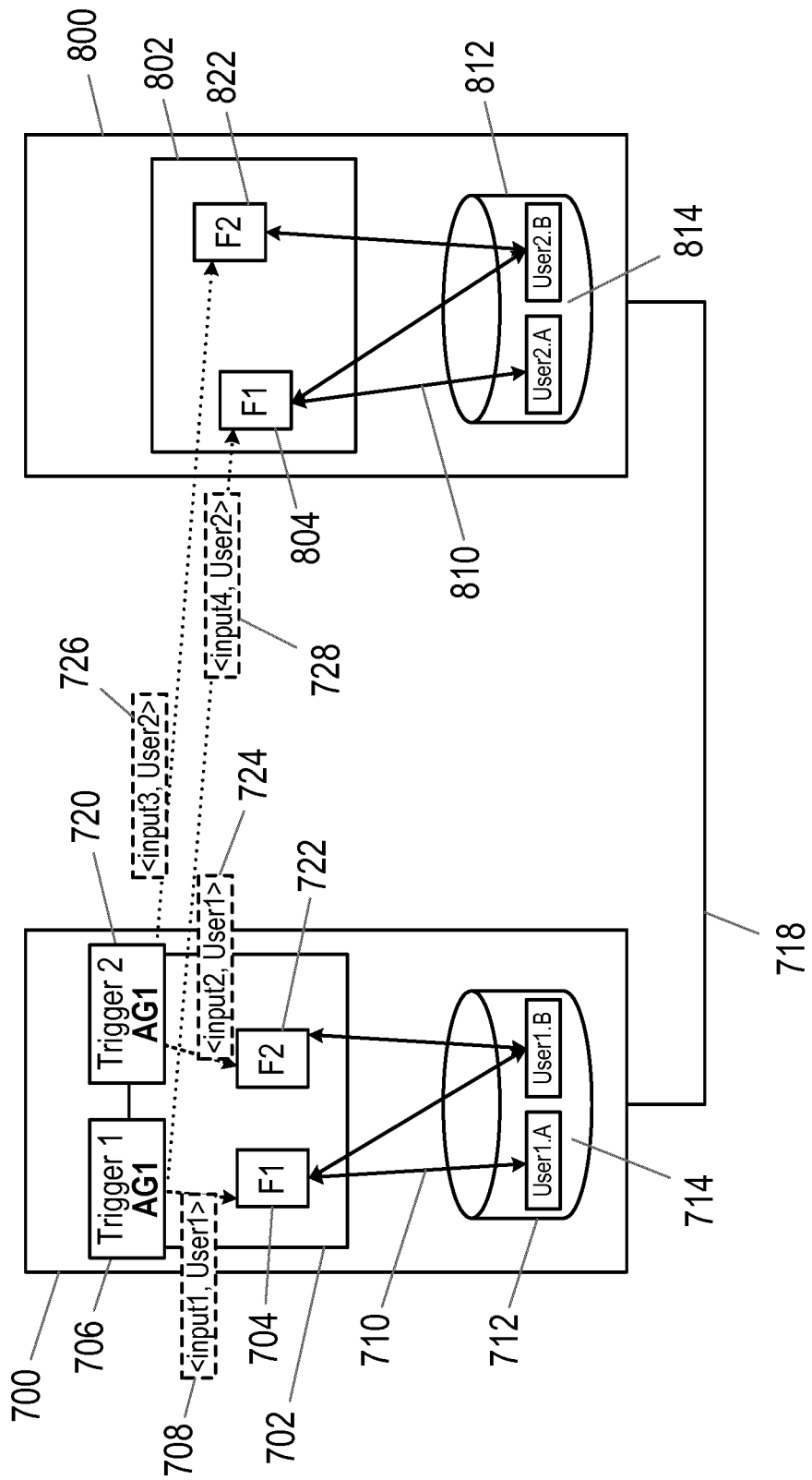
FIG. 5 is a block diagram illustrating an example function-as-a-service system according to an embodiment.

There is thus described herein an advantageous technique for handling execution of a function in a FaaS system. FIGS. 3, 4 and 5 are block diagrams illustrating example FaaS systems to demonstrate this advantageous technique. FIG. 3 will first be described to illustrate some of the issues that the technique is aimed at overcoming and FIGS. 4 and 5 will then be described to illustrate the manner in which the technique can overcome these issues.

FIG. 3 is a block diagram illustrating an example FaaS system. In the example illustrated in FIG. 3, the FaaS system comprises a first node 300 and a second node 400. As illustrated by the arrow 318 in FIG. 3, the first node 300 and the second node 400 can communicate, e.g. over a network.

The first node 300 is running a first runtime instance 302. The second node 400 is running a second runtime instance 402. The first node 300 comprises a first database 312 that is configured to store data 314. The second node 400 comprises a second database 412 that is also configured to store data 414. At each database 312, 412, the stored data 314, 414 can comprise a plurality of data elements, e.g. a plurality of keys. The first database 312 and/or the second database 412 can have multiple instances.

In each node 300, 400, the runtime instance 302, 402 and the instances of the database 312, 412 can form their own, separate clusters. In the case of the database 312, 412, the stored data is distributed between the instances participating in the cluster.

In the example illustrated in FIG. 3, a first function (F1) 304 is attached to a first trigger (Trigger 1) 306 and a second function (F2) 404 is attached to a second trigger (Trigger 2) 406. The first trigger 306 and the second trigger 406 may be different. FIG. 3 shows a single execution of both the first function 304 and the second function 404. The first function 304 has a first input (e.g. value) 308 and the second function 404 has a second input (e.g. value) 408. The first input 308 and the second input 408 may be different. The first function 304 and the second function 404 may use overlapping data, e.g. an overlapping set of data elements. In the example illustrated in FIG. 3, the first function 304 and the second function 404 both use data element N. As the attachment of the first function 304 and the second function 404 is performed independently, without further hints, the FaaS system of FIG. 3 allocates the first function 304 and the second function 404 to different nodes 300, 400 (or, more specifically, runtime instances 302, 402 of different nodes 300, 400) for execution.

As illustrated by the arrows 310 in FIG. 3, the first function 304 can locally access data 314 from the first database 312 of the first node 300. However, as illustrated by arrow 316 in FIG. 3, this requires the second function 404 to remotely access data 314 from the first database 312 of the first node 300 and remote data access has a significant performance impact on the execution of the second function 404. This is the case even if the first database 312 of the first node 300 can physically move data element N between its database instances and thus there is no optimum location for the first database 312 of the first node 300 to resolve this issue.

FIG. 4 is a block diagram illustrating another example FaaS system, which is in accordance with an embodiment aimed at overcoming the issues with the FaaS system of FIG. 3. In the example illustrated in FIG. 4, the FaaS system comprises a first node 500 and a second node 600. As illustrated by the arrow 518 in FIG. 4, the first node 500 and the second node 600 can communicate, e.g. over a network.

The first node 500 is running a first runtime instance 502. The second node 600 is running a second runtime instance 602. The first node 500 comprises a first database 512 that is configured to store data 514. The second node 600 comprises a second database 612 that is also configured to store data 614. At each database 512, 612, the stored data 514, 614 can comprise a plurality of data elements, e.g. a plurality of keys. The first database 512 and/or the second database 612 can have multiple instances. In each node 500, 600, the runtime instance 502, 602 and the instances of the database 512, 612 can form their own, separate clusters. In the case of the database 512, 612, the stored data is distributed between the instances participating in the cluster.

In the example illustrated in FIG. 4, a first function (F1) 504 is attached to a first trigger (Trigger 1) 506 and a second function (F2) 522 is attached to a second trigger (Trigger 2) 520. The first trigger 506 and the second trigger 520 may be different. FIG. 4 shows a single execution of both the first function 504 and the second function 522. The first function 504 has a first input (e.g. value) 508 and the second function 522 has a second input (e.g. value) 524. The first input 508 and the second input 524 may be different. The first function 504 and the second function 522 use overlapping data, e.g. an overlapping set of data elements. In the example illustrated in FIG. 4, the first function 504 and the second function 522 both use data element N.

The FaaS system of FIG. 4 thus allocates the first function 504 and the second function 522 to the same node, namely the first node 500 (or, more specifically, the runtime instance 502 of the first node 500) for execution. In more detail, in the example illustrated in FIG. 4, when the first function 504 and the second function 522 are attached to the first trigger 506 and the second trigger 520 respectively, the same affinity group (AG1) is defined for the FaaS system. For example, an affinity group (AG) property may be defined, such as a simple string or a numeric identification (ID). This ensures that the first function 504 and the second function 522 are attached to and will be executed on the same node 500 (or same runtime instance 502), ensuring local data access.

Thus, in response to the first trigger 506 on the first node 500 of the FaaS system for execution of the first function 504, execution of the first function 504 is initiated on the first node 500 of the FaaS system as data 514 to be accessed for the execution is stored on the first node 500 of the FaaS system. Similarly, in response to the second trigger 520 on the first node 500 of the FaaS system for execution of the second function 524, execution of the second function 524 is initiated on the first node 500 of the FaaS system as data 514 to be accessed for the execution is stored on the first node 500 of the FaaS system.

In this way, as illustrated by the arrows 510 in FIG. 4, the first function 504 and the second function 522 can locally access data 514 from the first database 512 of the first node 500 in this example. There is no requirement for any remote access in the example illustrated in FIG. 4, which reduces access times.

In some cases, the load caused by a single affinity group AG1 (which in this example comprises the first function 504 and the second function 522) may be higher than the first node 500 (or the first runtime instance 402 of the first node 500) can handle. This may be the case even with only a single function allocated to the AG. A manner in which this can be addressed will be described with reference to FIG. 5.

FIG. 5 is a block diagram illustrating an example of a FaaS system, which is in accordance with an embodiment also aimed at overcoming the issues with the FaaS system of FIG. 3. In the example illustrated in FIG. 5, the FaaS system comprises a first node 700 and a second node 800. As illustrated by the arrow 718 in FIG. 5, in some embodiments, the first node 700 and the second node 800 can communicate, e.g. over a network.

The first node 700 is running a first runtime instance 702. The second node 800 is running a second runtime instance 802. The first node 700 comprises a first database 712 that is configured to store data 714. The second node 800 comprises a second database 812 that is also configured to store data 814. At each database 712, 812, the stored data 714, 814 can comprise a plurality of data elements, e.g. a plurality of keys. The first database 712 and/or the second database 812 can have multiple instances. In each node 700, 800, the runtime instance 702, 802 and the instances of the database 712, 812 can form their own, separate clusters. In the case of the database 712, 812, the stored data is distributed between the instances participating in the cluster.

The FaaS system illustrated in FIG. 5 is the same FaaS system as that illustrated in FIG. 4. However, the FaaS system illustrated in FIG. 5 is in a different state to the FaaS system illustrated in FIG. 4. In particular, the FaaS system illustrated in FIG. 4 has a low load, where all executions of all functions 504, 522 (for all subscribers) can be served by a single node, namely the first node 500. In contrast, the FaaS system illustrated in FIG. 5 is under a higher load, where a single node (e.g. the first node 700) can no longer serve all executions of all functions 704, 722, 804, 822 and thus some executions of the first function (F1) 804 and the second function (F2) 822 (such as the executions for some, e.g. half, of the subscribers) are switched to the another node (e.g. the second node 800), along with the data 814 to be accessed for those executions.

In more detail, in FIG. 5, the data 714 stored on (e.g. the database 712 of) the first node 700 of the FaaS system of FIG. 5 is specific to a first subscriber (User1) and/or a location (A or B) of the first subscriber. The data 814 stored on (e.g. the database 812 of) the second node 800 of the FaaS system of FIG. 5 is specific to a second subscriber (User2) and/or a location (A or B) of the second subscriber. In the example illustrated in FIG. 5, the first function 704, 804 is attached to a first trigger (Trigger 1) 706 and the second function 722, 822 is attached to a second trigger (Trigger 2) 720. The first trigger 706 and the second trigger 720 may be different.

With reference to FIG. 5, in response to the first trigger 706 on the first node 700 of the FaaS system for execution of the first function 704, execution of the first function 704 is initiated on (e.g. the first runtime instance 702 of) the first node 700 of the FaaS system if the data 714 to be accessed for the execution is stored on (e.g. the database 712 of) the first node 700 of the FaaS system. Alternatively or in addition, in response to the first trigger 706 on the first node 700 of the FaaS system for execution of the first function 804, execution of the first function 804 is initiated on (e.g. the second runtime instance 802 of) the second node 800 of the FaaS system if the data 814 to be accessed for the execution is stored on (e.g. the database 812 of) the second node 800 of the FaaS system.

Similarly, in response to the second trigger 720 on the first node 700 of the FaaS system for execution of the second function 722, execution of the second function 722 is initiated on (e.g. the first runtime instance 702 of) the first node 700 of the FaaS system if the data 714 to be accessed for the execution is stored on (e.g. the database 712 of) the first node 700 of the FaaS system. Alternatively or in addition, in response to the second trigger 720 on the first node 700 of the FaaS system for execution of the second function 822, execution of the second function 822 is initiated on (e.g. the second runtime instance 802 of) the second node 800 of the FaaS system if the data 814 to be accessed for the execution is stored on (e.g. the database 812 of) the second node 800 of the FaaS system. Thus, the execution of the first function 704, 804 is initiated on the same node 700, 800 as the second function 722, 822 for which the same data 714, 814 is to be accessed for execution of the second function 722, 822.

In contrast to FIGS. 3 and 4, which show execution of both the first function 304, 504 and the second function 404, 522 on the same node 500, the example illustrated in FIG. 5 shows multiple executions of the first function 704, 804 and multiple executions of the second function 722, 822 on different nodes 700, 800. More specifically, in FIG. 5, the first function 704 is executed on (e.g. the runtime instance 704 of) the first node 700 and the first function 804 is also executed on (e.g. the runtime instance 804 of) the second node 800. Similarly, in FIG. 5, the second function 722 is executed on (e.g. the runtime instance 704 of) the first node 700 and the second function 822 is also executed on (e.g. the runtime instance 804 of) the second node 800. Thus, in FIG. 5, the execution of the first function 704, 804 and the second function 722, 822 is sharded to multiple (or, more specifically, two) nodes 700, 800.

The first function 704 executed on the first node 700 has a first input (e.g. value) 708, the second function 722 executed on the first node 700 has a second input (e.g. value) 724, the second function 822 executed on the second node 800 has a third input (e.g. value) 726, and the first function 804 executed on the second node 800 has a fourth input (e.g. value) 728. Any one or more of the first input 708, second input 724, third input 726, and fourth input 728 may be different.

Based on the inputs 708, 724, 726, 728 that are usually given to the functions 704, 722, 804, 822 during triggering, it is not possible to identify which subscriber the current execution will work on as the inputs 708, 724, 726, 728 may be given in any custom encoded form. Thus, according to this embodiment, the input 708, 724, 726, 728 for each function triggering provides a hint to the node 700, 800 (or runtime instance 702, 802) on which the function 704, 722, 804, 822 is to be executed. For example, a token may be provided as part of the input 708, 724, 726, 728 for each function triggering. The token can have a relation with the externalized data elements 814 that a function 804, 822 is to access, e.g. in majority. For example, the token may be a subscriber identification (ID). A token can be used by a function 704, 722, 804, 822 to derive different subscriber-specific data elements 714, 814 in a database (e.g. subscriber-specific keys in a key-value store) 712, 812. In some embodiments, the token may be generated by extracting a relevant part of the input 708, 724, 726, 728 or by hashing the input 708, 724, 726, 728, e.g. with a custom hash function. In some embodiments, the same method for generating the token may be used for all the executions to ensure consistent behaviour. For example, the token may always be a given subscriber's ID according to some embodiments. Although FIG. 5 only shows an attachment-based triggering, the token may be used by the FaaS system for direct function executions as well.

If the input 708, 724, 726, 728 for each function 704, 722, 804, 822 is indicative of the data 714, 814 (or a majority of the data 714, 814) to be accessed for the execution of the first function 704, 722, 804, 822, the functions 704, 722, 804, 822 that are to access the same data 714, 814 (or the majority of the same data 714, 814) can be executed on the same node 700, 800. For example, if a token is provided, the FaaS system can ensure that functions 704, 722, 804, 822 with the same token are executed on the same node 700, 800. This makes it possible for functions (or groups of functions) to be consistently spread to multiple nodes 700, 800, whilst maintaining the data locality features as well. In FIG. 5, this means that execution of the functions 704, 722 related to User1 can consistently be handled by the first node 700 (or, more specifically, the first runtime 702 of the first node 700), while the execution of the functions 804, 822 related to User2 can consistently be handled by the second node 800 (or, more specifically, the second runtime 802 of the second node 800).

In more detail, in the example illustrated in FIG. 5, the first input 708 provided to the first function 704 is (e.g. can include a token) indicative of the data 714 (or a majority of the data 714) to be accessed for the execution of the first function 704, the second input 724 provided to the second function 722 is (e.g. can include a token) indicative of the data 714 (or a majority of the data 714) to be accessed for the execution of the second function 722, the third input 726 provided to the second function 822 is (e.g. can include a token) indicative of the data 814 (or a majority of the data 814) to be accessed for the execution of the second function 822, and the fourth input 728 provided to the first function 804 is (e.g. can include a token) indicative of the data 814 (or a majority of the data 814) to be accessed for the execution of the first function 804.

For example, the first input 708 provided to the first function 704 may be (e.g. can include a token) indicative of a subscriber (or user) to which the data 714 is specific and/or a location of the subscriber to which the data 714 is specific (e.g. User 1 and location A), the second input 724 provided to the second function 722 may be (e.g. can include a token) indicative of a subscriber (or user) to which the data 714 is specific and/or a location of the subscriber to which the data 714 is specific (e.g. User 1 and location B), the third input 726 provided to the second function 822 may be (e.g. can include a token) indicative of a subscriber (or user) to which the data 814 is specific and/or a location of the subscriber to which the data 814 is specific (e.g. User 2 and location B), and the fourth input 728 provided to the first function 804 may be (e.g. can include a token) indicative of a subscriber (or user) to which the data 814 is specific and/or a location of the subscriber to which the data 814 is specific (e.g. User 2 and location A).

The first function 704 and the second function 722 executed on the first node 700 may use overlapping data, e.g. an overlapping set of data elements. In the example illustrated in FIG. 5, the first function 704 and the second function 722 executed on the first node 700 both use data element "User1.B". Similarly, the first function 804 and the second function 822 executed on the second node 800 may use overlapping data, e.g. an overlapping set of data elements. In the example illustrated in FIG. 5, the first function 804 and the second function 822 executed on the second node 800 both use data element "User2.B". Thus, as FIG. 5 shows, the functions 704, 722, 804, 822 are accessing subscriber specific data elements (e.g. keys) 714, 814 and thus function executions related to the same subscriber are executed on the same node 700, 800 or, more specifically, on the same runtime instance 702, 802 of the same node 700, 800.

Thus, related data elements 714, 814 can be stored in the local databases 712, 812 (or local instances of the databases 712, 812) for all subscribers. In this way, optimal partitioning of data in the FaaS system can be achieved and optimal performance of the FaaS system can be provided. During scaling in or out events, a fraction of tokens may be reallocated to new nodes of the FaaS, but the FaaS system can automatically reach a stable token distribution after a short period of time.

Returning back to FIG. 5, the first function 704 and the second function 722 executed on the first node 700 may be assigned to an existing group of functions for which the same data 714 is to be accessed for execution of the functions or a group of functions comprising the first function 704 and the second function 722 executed on the first node 700 for which the same data 714 is to be accessed for execution of the functions may be created. Similarly, the first function 804 and the second function 822 executed on the second node 800 may be assigned to an existing group of functions for which the same data 814 is to be accessed for execution of the functions or a group of functions comprising the first function 804 and the second function 822 executed on the second node 800 for which the same data 814 is to be accessed for execution of the functions may be created. Each group of functions are executable on the same node. As previously mentioned, a group of functions can be referred to as an affinity group (AG).

Thus, according to the example of FIG. 5, the function executions may be split into multiple shards that are allocated to multiple nodes (or, more specifically, multiple runtime instances) in a controlled fashion. FIG. 5 shows such a case where execution of the first function 704, 804 attached to the first trigger 706 is split into multiple shards that are allocated to the first node 700 and the second node 800 respectively, and execution of the second function 722, 822 attached to the second trigger 720 is split into multiple shards that are allocated to the first node 700 and the second node 800 respectively. In the example illustrated in FIG. 5, the triggering is handled by the first node 700 (or, more specifically, the first runtime instance 702 of the first node 700), but it can instead be handled by the second node 800 (or, more specifically, the second runtime instance 802 of the second node 800) according to other examples.

In this way, as illustrated by the arrows 710, 810 in FIG. 5, the first function 704, 804 and the second function 722, 822 can locally access data 714, 814 from the first database 712 of the first node 700 or the second database 812 of the second node 800. There is no requirement for any remote access in the example illustrated in FIG. 5, which reduces access times. Moreover, load management can be used to prevent the load (e.g. caused by a single AG) being higher than a node 700, 800 (or a runtime instance 702, 802 of a node 700, 800) can handle.

In some embodiments, for example, if a load generated by execution of a group of functions AG1 becomes greater than an available capacity of the node 700 of the FaaS system on which the execution of that group of functions AG1 is initiated, execution of the functions 804, 822 of the group AG1 specific to a subscriber (User2) may be switched from the node 700 of the FaaS system on which the group of functions AG1 is executed to another node 800 of the FaaS system (e.g. for which an available capacity is less than the load generated by execution of the functions 804, 822 of the group AG1 specific to the subscriber User2 and) at which data to be accessed for execution of the functions 804, 822 of the group AG1 specific to the subscriber User2 is stored. This results in the arrangement illustrated in FIG. 5.

Although not illustrated in FIG. 5, in some embodiments involving a group of functions AG1, the group of functions AG1 may be executed on a plurality of nodes of the FaaS system, e.g. the first node 700 of the FaaS system and the second node 800 of the FaaS system. If a load generated by execution of the group of functions AG1 becomes a predefined amount less than a combined available capacity of the plurality of nodes 700, 800 of the FaaS system on which the group of functions AG1 are executed, for a selected node (e.g. the second node 800) of the plurality of nodes 700, 800 of the FaaS system, execution of functions (e.g. the functions 804, 822) of the group AG1 may be switched from the selected node (e.g. the second node 800) of the FaaS system to another node (e.g. the first node 700) of the FaaS system that is executing functions 704, 722 of the group AG1.

Figure 6:
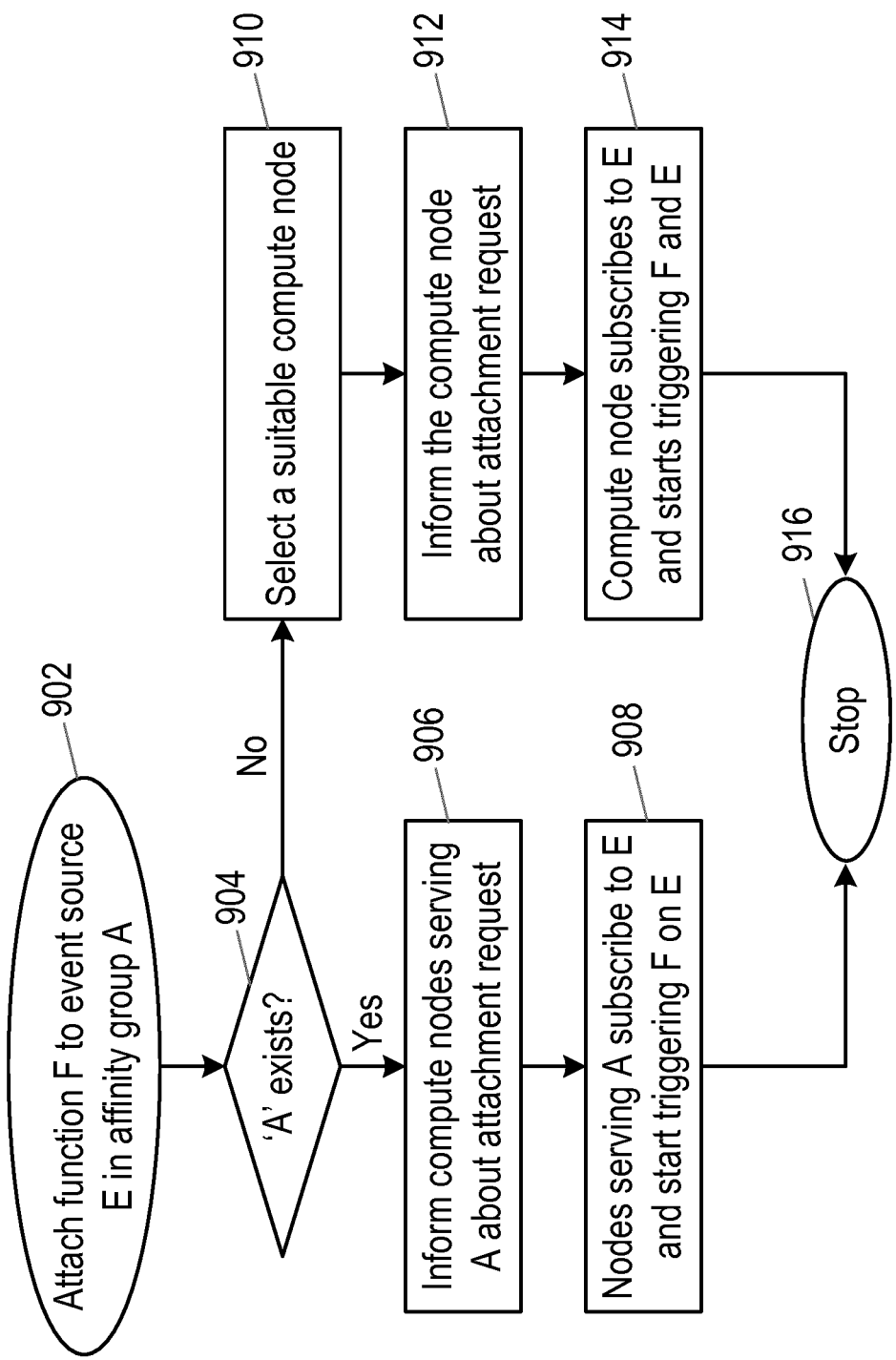
FIG. 6 is a block diagram illustrating a method performed by a node according to an embodiment.

FIG. 6 is a flowchart illustrating a method performed by a node 10 in accordance with an embodiment. In more detail, FIG. 6 illustrates the manner in which an attachment process can be handled by the FaaS system. The node 10 described earlier with reference to FIG. 1 can be configured to operate in accordance with the method of FIG. 6. The method can be performed by or under the control of the processing circuitry 12 of the node 10.

At block 902 of FIG. 6, an attempt is made to attach a function F to an event source E in a group of functions, namely affinity group A. At block 904 of FIG. 6, if affinity group A exists in order for the function F to be added to that affinity group, the method proceeds to block 906 of FIG. 6. At block 906 of FIG. 6, the node serving affinity group A is notified about the attachment request, such that the node serving affinity group A can start executing the function F. At block 908 of FIG. 6, the node serving affinity group A subscribes to the event source E and starts triggering the function F on the event source E.

On the other hand, if affinity group A does not exist and a new group of functions (or a new affinity group) is to be created at block 904 of FIG. 6, the method proceeds to block 910 of FIG. 6. At block 910 of FIG. 6, a node is selected to serve the new group of functions. The node may, for example, be selected based on load patterns, e.g. a node with the lowest load may be selected. As described earlier, a group of functions may spread to multiple nodes over time. At block 912 of FIG. 6, the selected node is informed about the attachment request, such that the selected node can start executing the function F. At block 914 of FIG. 6, the selected node subscribes to the event source E and start triggering the function F on the event source E. The method ends at block 916 of FIG. 6.

Figure 7:
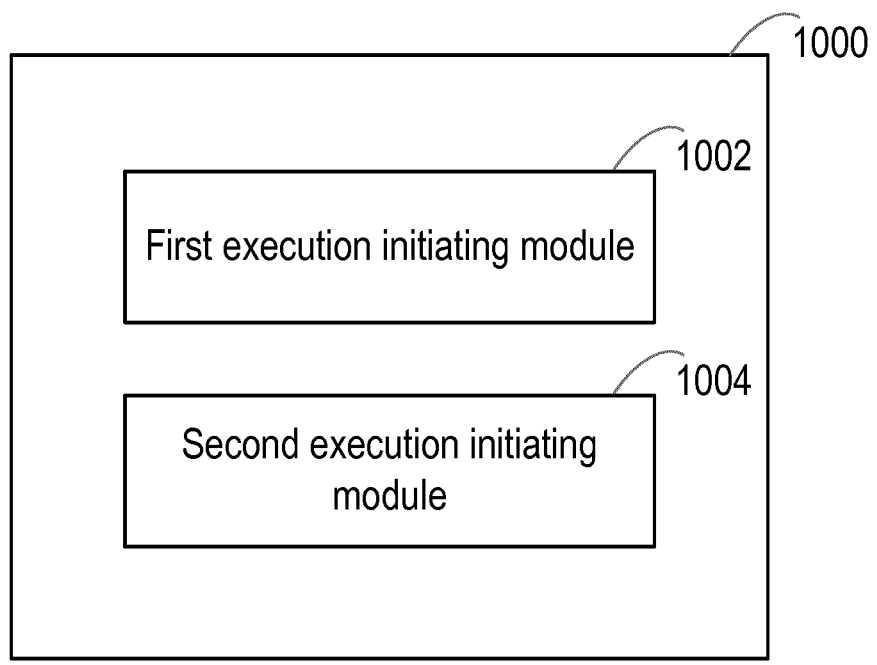
FIG. 7 is a block diagram illustrating a node according to an embodiment.

FIG. 7 is a block diagram illustrating a node 1000 in accordance with an embodiment. The node 1000 comprises a first execution initiating module 1002 configured to, in response to a trigger on a first node of the FaaS system for execution of a function, initiate execution of the function on the first node of the FaaS system if data to be accessed for the execution is stored on the first node of the FaaS system. The node 1000 comprises a second execution initiating module 1004 configured to initiate execution of the function on a second node of the FaaS system if the data to be accessed for the execution is stored on the second node of the FaaS system. If data to be accessed for the execution is stored on the first node and the second node of the FaaS system, the first execution initiating module 1002 may be configured to initiate execution of the function on the first node of the FaaS system and the second execution initiating module 1004 may be configured to initiate execution of the function on the second node of the FaaS system. The node 1000 may operate in the manner described herein.

There is also provided a FaaS system, which can comprise at least one node 10, 1000 as described herein. The FaaS system can also comprise the first node described herein, the second node described herein, the third node described herein, and/or any other nodes referred to herein.

There is also provided a computer program comprising instructions which, when executed by processing circuitry (such as the processing circuitry 12 of the node 10 described earlier), cause the processing circuitry to perform at least part of the method described herein. There is provided a computer program product, embodied on a non-transitory machine-readable medium, comprising instructions which are executable by processing circuitry (such as the processing circuitry 12 of the node 10 described earlier) to cause the processing circuitry to perform at least part of the method described herein. There is provided a computer program product comprising a carrier containing instructions for causing processing circuitry (such as the processing circuitry 12 of the node 10 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

The node functionality described herein can be performed by hardware. Thus, any one or more nodes described herein can be a hardware node. However, it will also be understood that at least part or all of the node functionality described herein can be virtualized. For example, the functions performed by any one or more nodes can be implemented in software running on generic hardware that is configured to orchestrate the node functionality. Thus, in some embodiments, any one or more nodes described herein can be a virtual node. In some embodiments, at least part or all of the node functionality described herein may be performed in a network enabled cloud. The node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically.

Thus, in the manner described herein, there is advantageously provided an improved technique for handling execution of a function in a FaaS system.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for handling execution of a function in a function-as-a-service (FaaS) system, the method comprising:
    notifying one or more nodes of the FaaS system serving a group of functions about an attachment of a function into a same node for which same data is to be accessed for execution of the function and at least one other function in the group; and
    in response to a received trigger on a first node of the FaaS system for the execution of the function:
        generating a token by performing processing of the received trigger, the function being attached to the trigger, the trigger including information about on which of the first node of the FaaS system and a second node of the FaaS system to execute the function, the token being indicative of a location of a subscriber of the FaaS system to which the same data is specific, and the token further being indicative of the same data to be accessed by the function and the at least one other function in the group of functions during the execution;
        providing the generated token to the function; and
        allocating execution of the function in one or more nodes by performing one or both of:
            one or both of causing and establishing execution of the function on the first node of the FaaS system if the same data to be accessed for the execution is stored on the first node of the FaaS system; and
            one or both of causing and establishing execution of the function on the second node of the FaaS system if the same data to be accessed for the execution is stored on the second node of the FaaS system;
        the execution of the function being one or both of caused and established on the same node as the at least one other function in the group of functions based on the token.

2. The method as claimed in claim 1, wherein one or both of:
    the same data that is to be accessed for the execution of the function and that is stored on the first node of the FaaS system is further specific to one or both of a first subscriber and a location of the first subscriber; and
    the same data that is to be accessed for the execution of the function and that is stored on the second node of the FaaS system is further specific to one or both of a second subscriber and a location of the second subscriber.

3. The method as claimed in claim 1, wherein an input provided to the function is indicative of the same data to be accessed for the execution or a majority of the same data to be accessed for the execution.

4. The method as claimed in claim 1, wherein one or both of: an input provided to the function is indicative of the subscriber to which the same data to be accessed for the execution of the function is specific and the location of the subscriber to which the same data to be accessed for the execution is specific.

5. The method as claimed in claim 1, wherein the method comprises, if a load generated by the execution of the function is greater than an available capacity of the first node or the second node on which the execution is initiated, initiating the execution of the function on a third node of the FaaS system for which an available capacity is less than the load generated by the execution and at which the same data to be accessed for the execution is stored.

6. The method as claimed in claim 1, wherein the function is associated with an existing group of functions for which the same data is to be accessed for execution of the functions.

7. The method as claimed in claim 1, wherein the group of functions are executable on the same node.

8. The method as claimed in claim 1, wherein the method comprises, if a load generated by execution of the group of functions becomes greater than the available capacity of a node of the FaaS system on which the group of functions is executed, switching execution of functions of the group specific to the subscriber from the node of the FaaS system on which the group of functions is executed to another node of the FaaS system at which data to be accessed for execution of the functions of the group specific to the subscriber is stored.

9. The method as claimed in claim 1, wherein the functions in the group of functions are executed on a plurality of nodes of the FaaS system, wherein the method comprises, if a load generated by execution of the group of functions becomes a predefined amount less than a combined available capacity of the plurality of nodes of the FaaS system on which the group of functions is executed, for a selected node of the plurality of nodes of the FaaS system, switching execution of functions of the group from the selected node of the FaaS system to another node of the FaaS system that is executing functions of the group.

10. A node for handling execution of a function in a function-as-a-service (FaaS) system, wherein the node comprises processing circuitry configured to:
   notify one or more nodes of the FaaS system serving a group of functions about an attachment of a function into a same node for which same data is to be accessed for execution of the function and at least one other function in the group; and
   in response to a received trigger on a first node of the FaaS system for the execution of the function:
      generate a token by performing processing of the received trigger, the function being attached to the trigger, the trigger including information about on which of the first node of the FaaS system and a second node of the FaaS system to execute the function, the token being indicative of a location of a subscriber of the FaaS system to which the same data is specific, and the token further being indicative of the same data to be accessed by the function and the at least one other function in the group of functions during the execution;
      provide the generated token to the function; and
      allocate execution of the function in one or more nodes by performing one or both of:
         one or both of cause and establish execution of the function on the first node of the FaaS system if the same data to be accessed for the execution is stored on the first node of the FaaS system; and
         one or both of cause and establish execution of the function on the second node of the FaaS system if the same data to be accessed for the execution is stored on the second node of the FaaS system;
      the processing circuitry being configured to one or both of cause and establish execution of the function on the same node as the at least one other function in the group of functions based on the token.

11. The node as claimed in claim 10, wherein the node is the first node.

12. The node as claimed in claim 10, wherein one or both of:
   the same data that is to be accessed for the execution of the function and that is stored on the first node of the FaaS system is further specific to one or both of a first subscriber and a location of the first subscriber; and
   the same data that is to be accessed for the execution of the function and that is stored on the second node of the FaaS system is further specific to one or both of a second subscriber and a location of the second subscriber.

13. The node as claimed in claim 10, wherein an input provided to the function is indicative of the same data to be accessed for the execution or a majority of the same data to be accessed for the execution.

14. The node as claimed in claim 10, wherein one or both of an input provided to the function is indicative of the subscriber to which the same data to be accessed for the execution of the function is specific and the location of the subscriber to which the same data to be accessed for the execution is specific.

15. The node as claimed in claim 10, wherein the processing circuitry is configured to, if a load generated by the execution of the function is greater than an available capacity of the first node or the second node on which the execution is initiated, initiate the execution of the function on a third node of the FaaS system for which an available capacity is less than the load generated by the execution and at which the same data to be accessed for the execution is stored.

16. The node as claimed in claim 10, wherein the function is associated with an existing group of functions for which the same data is to be accessed for execution of the functions.

17. The node as claimed in claim 10, wherein the group of functions are executable on the same node.

18. The node as claimed in claim 10, wherein the processing circuitry is configured to, if a load generated by execution of the group of functions becomes greater than the available capacity of a node of the FaaS system on which the group of functions is executed, switch execution of functions of the group specific to the subscriber from the node of the FaaS system on which the group of functions is executed to another node of the FaaS system at which data to be accessed for execution of the functions of the group specific to the subscriber is stored.

19. The node as claimed in claim 10, wherein the functions in the group of functions are executed on a plurality of nodes of the FaaS system, wherein the processing circuitry is configured to, if a load generated by execution of the group of functions becomes a predefined amount less than a combined available capacity of the plurality of nodes of the FaaS system on which the group of functions is executed, for a selected node of the plurality of nodes of the FaaS system, switch execution of functions of the group from the selected node of the FaaS system to another node of the FaaS system that is executing functions of the group.

20. A function-as-a-service (FaaS) system comprising a node for handling execution of a function in the FaaS system, wherein the node is configured to:
   notify one or more nodes of the FaaS system serving a group of functions about an attachment of a function into a same node for which same data is to be accessed for execution of the function and at least one other function in the group; and
   in response to a received trigger on a first node of the FaaS system for the execution of the function:
      generate a token by performing processing of the received trigger, the function being attached to the trigger, the trigger including information about on which of the first node of the FaaS system and a second node of the FaaS system to execute the function, the token being indicative of a location of a subscriber of the FaaS system to which the same data is specific, and the token further being indicative of the same data to be accessed by the function and the at least one other function in the group of functions during the execution;
      provide the generated token to the function; and
      allocate execution of the function in one or more nodes by performing one or both of:
         one or both of cause and establish execution of the function on the first node of the FaaS system if the same data to be accessed for the execution is stored on the first node of the FaaS system; and
         one or both of cause and establish execution of the function on the second node of the FaaS system if the same data to be accessed for the execution is stored on the second node of the FaaS system;

the node being configured to one or both of cause and establish execution of the function on the same node as the at least one other function in the group of functions based on the token.

* * * * *